United States Patent
Arai et al.

(10) Patent No.: US 6,650,026 B2
(45) Date of Patent: Nov. 18, 2003

(54) DETACHABLE FACE PLATE FOR AUDIO AND/OR VIDEO APPARATUS IN A VEHICLE

(75) Inventors: Daisuke Arai, Kawagoe (JP); Akira Shimizu, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 158 days.

(21) Appl. No.: 09/935,640

(22) Filed: Aug. 24, 2001

(65) Prior Publication Data

US 2002/0024597 A1 Feb. 28, 2002

(30) Foreign Application Priority Data

Aug. 28, 2000 (JP) ........................................ 2000-257721

(51) Int. Cl.[7] ............................................. B60R 25/00
(52) U.S. Cl. ........................ 307/10.2; 381/87; 312/7.1; 455/346
(58) Field of Search .................... 381/86, 87; 455/345, 455/346, 348, 351, 352; 180/287, 289; 307/10.2; 312/7.1; D14/157; 439/153

(56) References Cited

U.S. PATENT DOCUMENTS

| 5,554,966 A | * | 9/1996 | Iijima et al. ................. 340/687 |
| 5,575,544 A | * | 11/1996 | Hasegawa et al. ........... 312/7.1 |
| 5,637,928 A | * | 6/1997 | Nakajima et al. ........... 307/10.2 |

FOREIGN PATENT DOCUMENTS

JP             9-237978           9/1997

* cited by examiner

*Primary Examiner*—Shawn Riley
(74) *Attorney, Agent, or Firm*—Morgan, Lewis & Bockius LLP

(57) ABSTRACT

An audio and/or video device of a vehicle that allows an operation panel to be attached to and detached from a main unit of the device with either front or back side of the operation panel being directed forwards for the purpose of preventing the device from being stolen. The device includes a retention mechanism for releasably retaining the operation panel in the main unit of the device. The retention mechanism allows the operation panel to be retained in the device main unit with either the front or back side of the operation panel being directed forwards or exposed.

6 Claims, 11 Drawing Sheets

DETACHABLE FACE PLATE FOR AUDIO AND/OR VIDEO APPARATUS IN A VEHICLE

BACKGROUND OF THE INVENTION

1. Field of the Invention

The present invention relates to an audio and/or video apparatus (simply referred to as "AV apparatus" below) for a vehicle, and more particularly to a vehicle's AV apparatus having an operation panel (or control panel).

2. Description of the Related Art

A mechanism that allows an operation panel to be removed from a main body (or unit) of a vehicle's AV apparatus is known as a theftproof measure for the vehicle's AV apparatus. Japanese Patent Kokai No. 9-237978, for example, teaches an electronic device that has an operation panel easily removable from a main body of the electronic device and a storage medium recordation and/or reproduction device that also has an operation panel easily removable from a main body of the device. In these devices, the operation panel having various operation switches thereon is pivotably supported at the front face of the device's main body by a support structure, and the support structure possesses an easy-to-remove function. Specifically, by removably supporting the operation panel from the front face of the device, a driver can take away the operation panel from the device's main body when no one remains in a car. This makes it difficult for others to recognize presence of the AV apparatus inside the car, and prevents the AV apparatus from being stolen.

The above described pivotable and removable support structure includes a shaft attached to one of the operation panel and device's main body and a bearing set attached to the other of the operation panel and device's main body, and one of the shaft and bearing set is movable and detachable in an axial direction of the shaft.

The removable structure of the operation panel disclosed in the above-mentioned Japanese Patent Kokai No. 9-237978, however, requires the driver to always carry the detached operation panel or to hide it in a certain place inside the car; the driver should pay utmost attention to avoid loosing the detached operation panel. This way of handling the operation panel would possibly result in loss of the operation panel so that it cannot be said a decent theftproof measure.

OBJECTS AND SUMMARY OF THE INVENTION

The present invention was developed to eliminate the above described problems and provides a removal and retention mechanism for an operation panel that has a simple structure and does not require administration such as carrying of the detached control panel and hiding it in a certain place in a vehicle when a driver leaves the car.

According to one aspect of the present invention, there is provided an AV apparatus installed in a vehicle comprising a main unit for reproducing an AV signal, an operation panel independent of the main unit and adapted to operate the main unit, and a retention mechanism for releasably retaining the operation panel relative to the main unit with either a front or back side of the operation panel being directed forwards.

BRIEF DESCRIPTION OF THE ACCOMPANYING DRAWINGS

Figure 10:
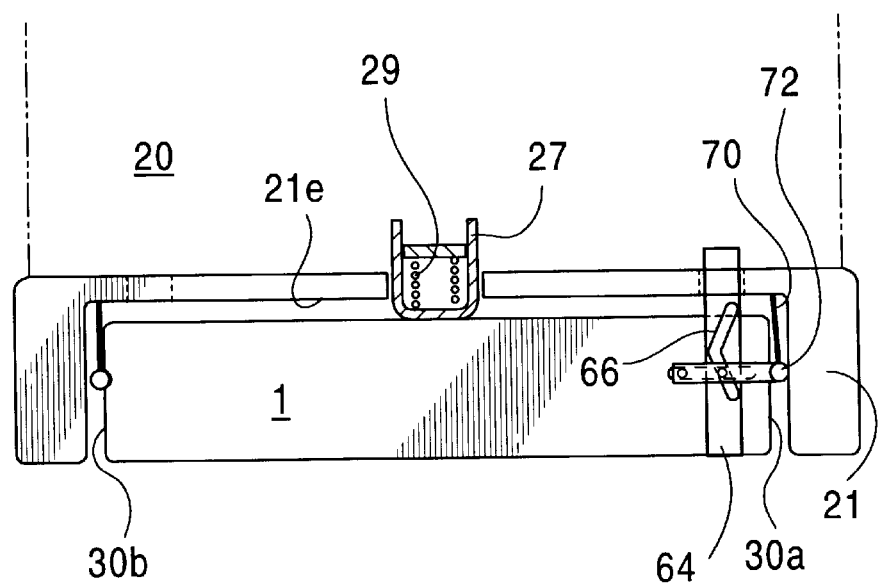
Figure 11:
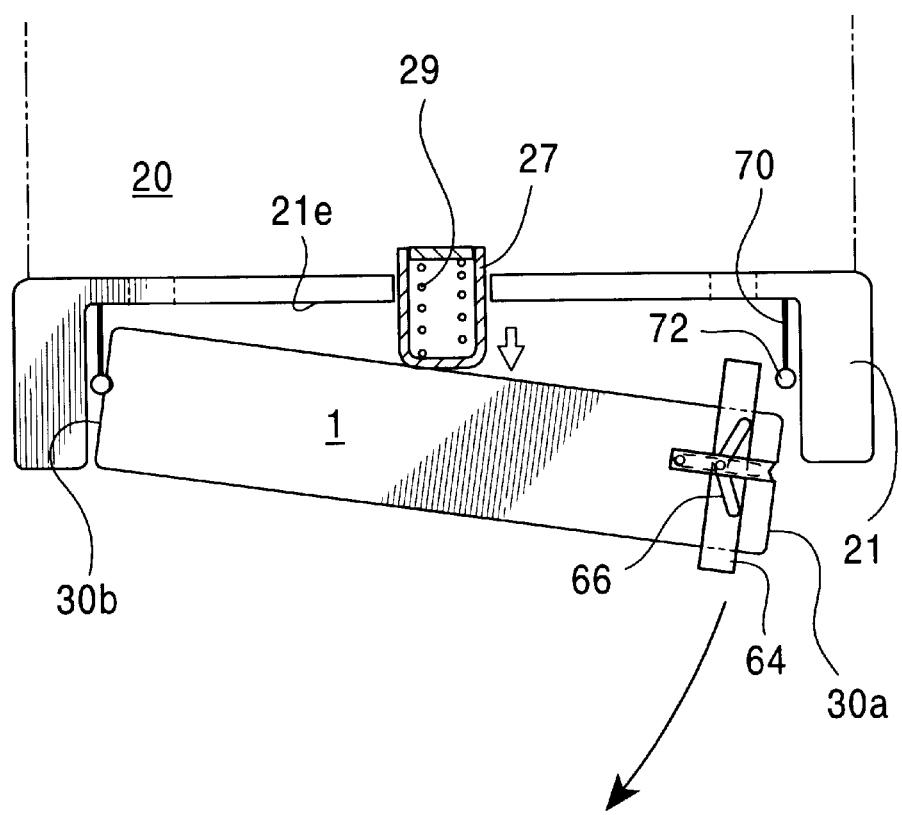

FIG. 10 also illustrates a schematic plan view of the second configuration of the second embodiment; and FIG. 11 still illustrates a schematic plan view of the third configuration of the second embodiment.

DETAILED DESCRIPTION OF THE INVENTION

Embodiments of the present invention will now be described in reference to the accompanying drawings.

In a vehicle's AV apparatus according to the present invention shown in FIGS. 1 through 5, an operation panel 1 has a generally flat and rectangular shape. Like a conventional one, the operation panel 1 has various operation buttons 2, an insertion opening 3 for receiving an AV recordation medium such as a cassette tape, a display part 4 such as a liquid crystal display, and a selection switch 5 on a front surface thereof. A release lever 12 is provided inside the operation panel 1 near a right lateral end face 30a of the operation panel. The release lever 12 is part of a mechanism for detaching the operation panel from a main body (or unit) 20 of the apparatus. Elongated grooves 14 are formed in four corner portions of the operation panel 1 at upper and lower ends of the lateral end faces 30a and 30b of the operation panel 1. Among these grooves 14 at the four corners, those formed at the upper and lower ends of the right lateral end face 30a have holes that allow an upper end 19a of a projection member 19 (will be described) and an acute free end 16 of the release lever 12 (will be described) to penetrate outwards.

Figure 4:
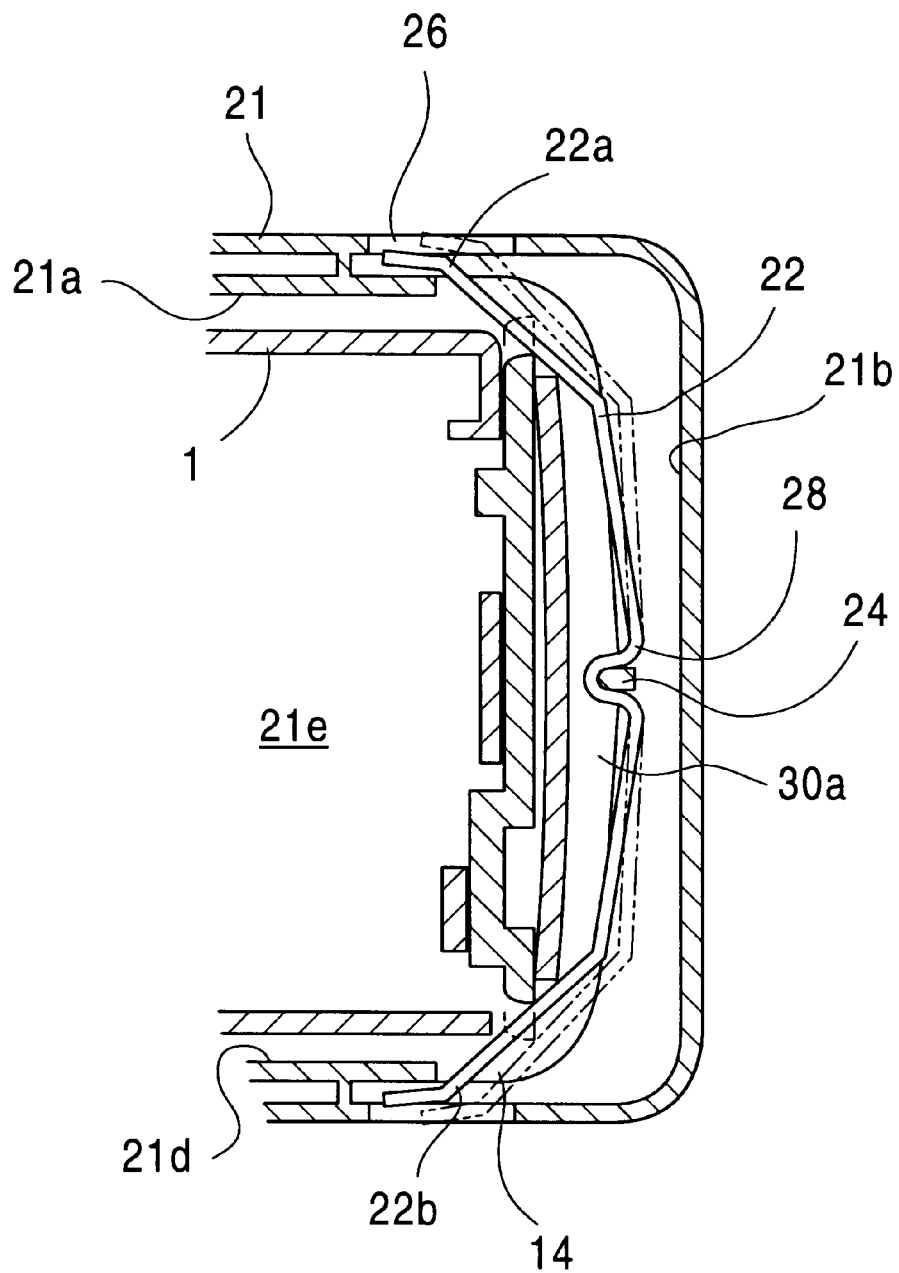
FIG. 4 illustrates a cross sectional view taken along the line B—B in FIG. 2.

A generally rectangular frame 21 that has a recess to receive the operation panel 1 is installed in a front portion of the apparatus main body 20. On lateral walls 21b and 21c of the recess of the frame 21, provided are generally semicircular bar (rod) springs 22. Each of the bar springs 22 has an engagement portion 28 at its approximate center. The lateral walls 21b and 21c of the frame recess have projections 24 such that the engagement portions 28 of the bar springs engage with the projections 24 and are supported by the frame 21. Upper and lower portions 22a and 22b of each bar spring 22 extend inside the frame recess such that they can fit in the mating grooves 14 of the operation panel 1. Upper and lower ends of each bar spring 22 are, however, buried in upper and lower walls 21a and 21d of the frame recess. As illustrated in FIG. 4, the upper and lower ends of the bar spring 22 are buried such that they bias the upper and lower walls 21a and 21d of the frame recess upwards and downwards respectively with the engagement portion 28 being a fulcrum.

Openings 26 are formed in the upper and lower walls 21a and 21d of the frame recess near respective ends of these walls, and the upper and lower ends of the bar springs 22 removably fit in these openings 26. The ends of the bar springs 22 are forced to come out from the inner walls of the frame recess when the operation panel 1 is taken out from the frame recess.

A push rod 27 is provided at an approximate center of a back wall 21e of the framer recess. The push rod 27 is supported by a coil spring 29 such that it can move back and forth penetrating the recess back wall 21e. When the operation panel 1 is fit into the recess of the frame 21, the elastic force of the coil spring 29 pushes the operation panel 1 to stably hold the operation panel 1. When the operation panel 1 is removed from the frame recess, the elastic force of the coil spring 29 also pushes the operation panel 1 to facilitate removal of the operation panel.

The back wall 21e of the frame recess has an AV recordation medium reception opening 23 at a position corresponding to the insertion opening 3 of the operation panel 1. Conductive contacts (not shown) for transmitting electric signals generated upon pushing the buttons 2 or selection switch 5 on the operation panel 1 to a reproduction device (replay device) located in the apparatus main body and adapted to reproduce information recorded on an AV recordation medium are provided on the back face of the operation panel 1 and the back wall 21e of the frame recess. The conductive contacts are arranged to abut each other when the operation panel 1 is fit in the apparatus main body.

Figure 1:
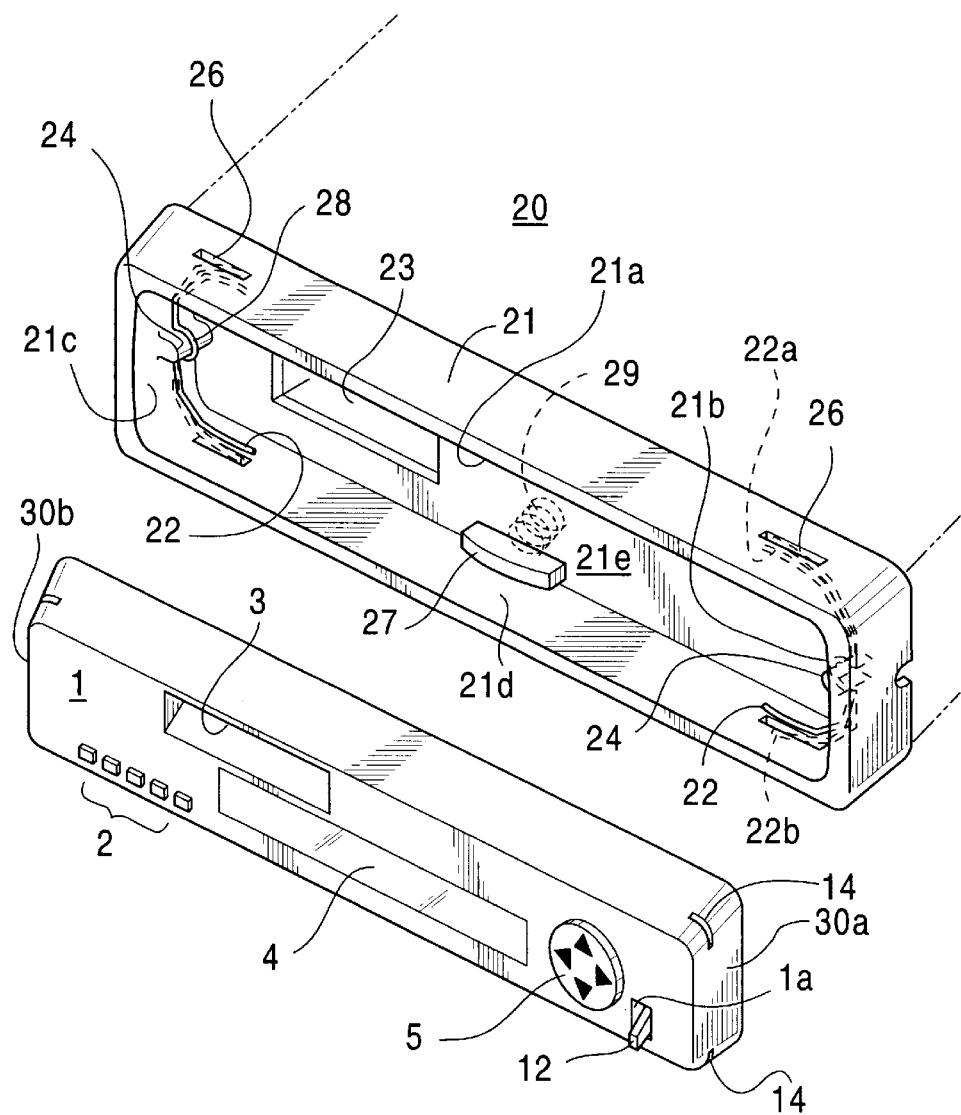
FIG. 1 illustrates a perspective view of a first embodiment of the present invention when an operation panel is detached.
Figure 2:
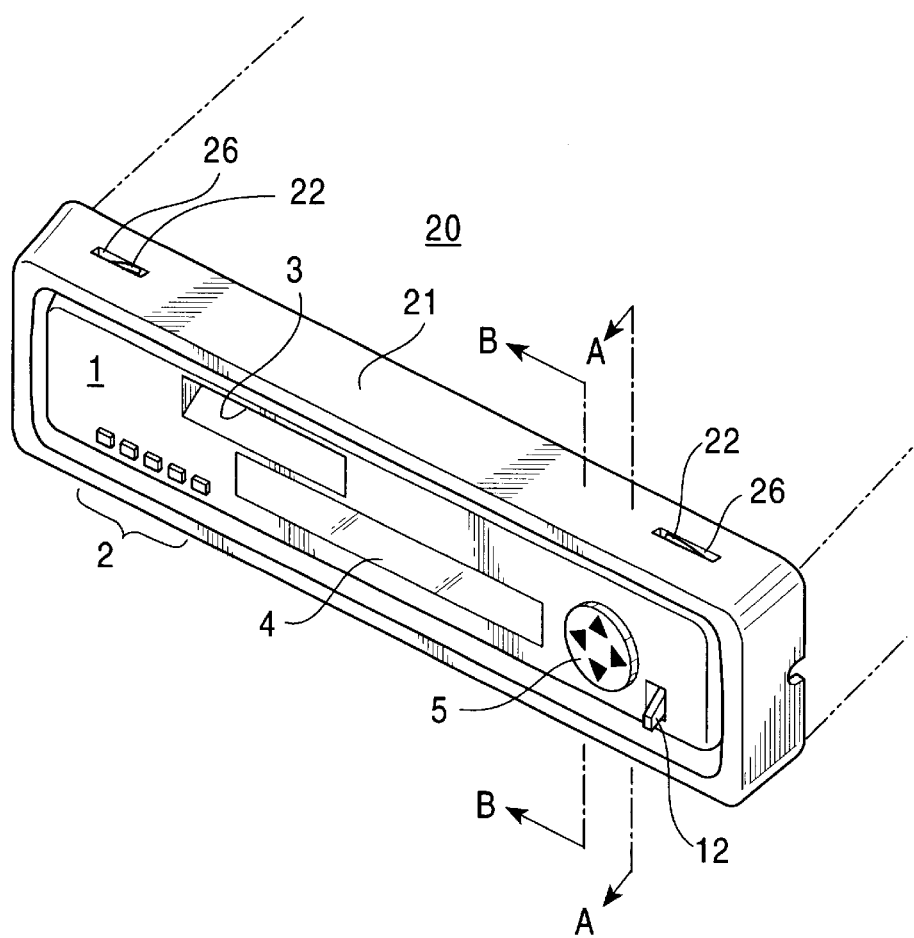
FIG. 2 illustrates a perspective view of the first embodiment when the operation panel is attached.
Figure 3:
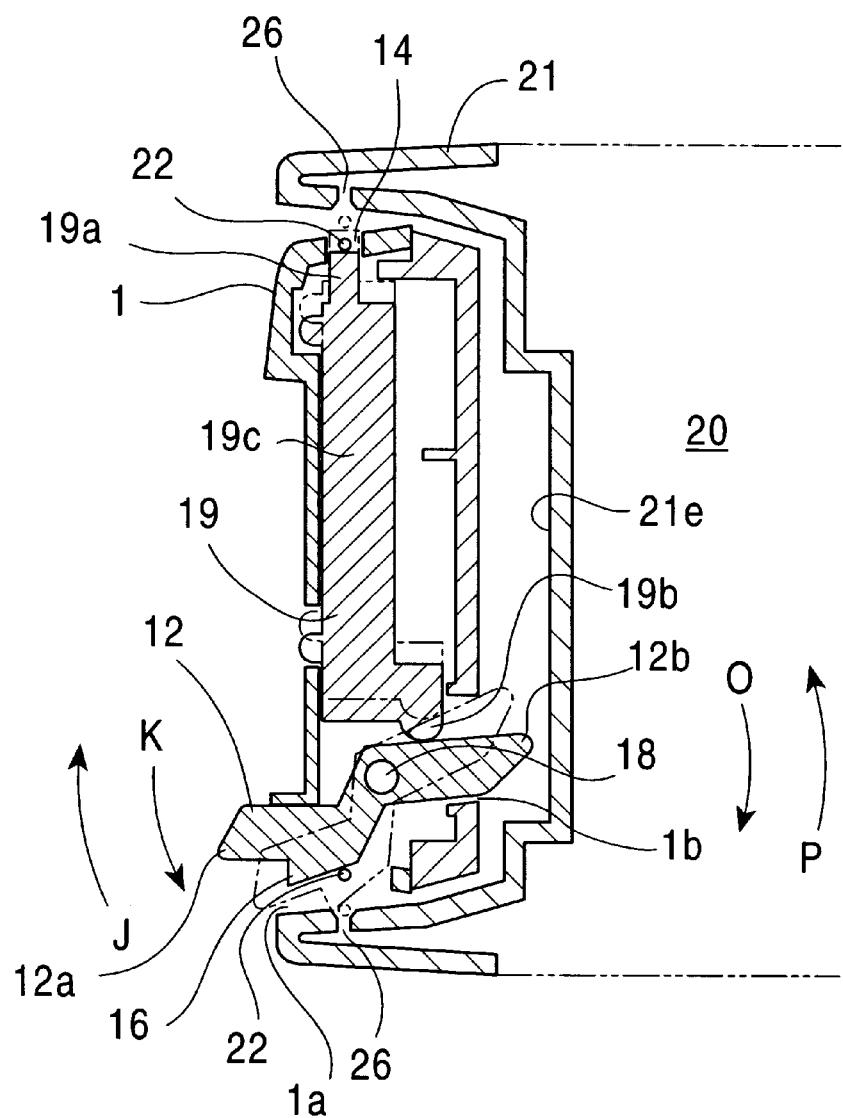
FIG. 3 illustrates a cross sectional view taken along the line A—A in FIG. 2.

As best seen in FIG. 3, when the operation panel 1 is inserted in the recess of the frame 21 with the front face of the operation panel being directed forwards, the release lever 12 having an approximately "S" shaped cross section extends through the front and back surfaces of the operation panel 1. One end 12a of the release lever 12 projects from a hole 1a formed in the front face of the operation panel 1 and the other end 12b projects from another hole 1b formed in the back face of the operation panel 1. The release lever 12 is pivotable about a support shaft 18 and biased in the J direction, i.e., clockwise, by a coil spring (not shown) provided near the shaft 18. The slots 1a and 1b of the operation panel 1 are configured such that the release lever 12 can pivot within a predetermined range of angle.

A projection member 19 having a generally rectangular cross section is installed in the operation panel 1 such that it moves up and down upon the pivoting movement of the release lever 12. The projection member 19 includes an upper portion 19a, a lower portion 19b and a center portion 19c. The upper portion 19a is thinner than the center portion 19c, and the free end of the lower portion 19b is hemispherical. The free end of the lower portion 19b contacts an upper surface of the right arm 12b of the release lever 12 at a position offset towards the free end of the right arm 12b from the shaft 18.

When an operator presses the left end 12a of the release lever 12 in the K direction in FIG. 3 against the biasing force of the coil spring, the release lever 12 is caused to pivot in the P direction in FIG. 3, and the right end 12b is also forced to rotate counterclockwise against the biasing force of the coil spring thereby pushing the lower end 19b upwards. As a result, the projection member 19 is moved upwards.

When the projection member 19 is lifted upwards upon the counterclockwise rotation of the release lever 12 in the drawing, the upper portion 19a of the projection member 19 protrudes from the opening formed in the groove 14 at the upper corner of the right lateral face 30a of the operation panel 1. This causes the upper portion 22a of the bar spring 22 engaged in the groove 14 to disengage and expand outside the groove 14 (see FIG. 4).

The left arm 12a of the release lever 12 has an acute protrusion 16 on a lower surface thereof. The acute protrusion 16 protrudes from an opening formed in the groove 14 at the lower corner of the right lateral face 30a of the operation panel 1 as the release lever 12 pivots in the K direction in FIG. 3. This causes the lower portion 22b of the bar spring 22 engaged in this groove 14 to expand outside the groove.

When the AV apparatus equipped with the operation panel 1 having the above described structure is used, the operation panel 1 is placed in the recess of the frame 21 of the apparatus main unit 20 with the front face of the operation panel 1 being directed forwards. In order to put the operation panel 1 in place, the operator first inserts the left lateral end face 30b of the operation panel 1 into the frame recess so as to engage the grooves 14 formed at the upper and lower ends of the left end face 30b with the upper and lower portions 22a and 22b of the left bar spring 22 thereby applying forces on the bar spring 22 in directions to expand the upper and lower portions 22a and 22b of the bar spring 22. While applying such forces, the operator then inserts the right lateral end face 30a of the operation panel 1 into the frame recess to engage the grooves 14 at the upper and lower ends of the right end face 30a with the upper and lower portions 22a and 22b of the right bar spring 22. Accordingly, the four grooves 14 formed at the upper and lower corners of the opposite lateral faces 30a and 30b of the operation panel 1 engage with the upper and lower portions 22a and 22b of the bar springs 22 respectively, and the elastic forces of the bar springs 22 (elastic expansion forces produced by the upper and lower portions 22a and 22b of the bar springs 22 engaged with the grooves 14) hold the operation panel 1 in the recess of the frame 21. When inserting the right end 30a of the operation panel 1 into the frame recess, the operator engages the right grooves 14 with the right bar spring 22 while the back side of the operation panel 1 is pushing the push rod 27. In other words, the operation panel 1 is held in the frame recess by the elastic forces of the bar springs 22 and the elastic force of the coil spring 29 of the push rod 27 that urges the operation panel 1 forwards from the back side thereof so that there is a good balance between the two different elastic forces. This contributes to enhanced retention of the operation panel 1 in the frame recess.

In order to remove the operation panel 1 from the frame recess with its front side being directed forwards, the operator pushes down the end 12a of the release lever 12 in the K direction in FIG. 3. The release lever 12 then pivots about the support shaft 18 in the K direction, i.e., counterclockwise direction in FIG. 3, against the biasing force of the coil spring acting in the J direction. At the same time, the other end 12b of the release lever 12 pivots in the P direction against the biasing force directed in the O direction, whereby the projection member 19 is lifted upwards. Upon this ascending movement, the upper end 19a of the projection member 19 protrudes from the opening formed in the upper end of the right lateral end face 30a of the operation panel 1 (this opening is formed in the groove 14 at the upper right corner of the operation panel 1), and moves to expand the upper portion 22a of the bar spring 22 against the elastic force of the bar spring 22 fit in the groove 14. As a result, the groove 14 and the bar spring 22 are disengaged from each other. When the upper portion 22a of the bar spring 22 is caused to expand, the upper end of the bar spring 22 protrudes from the opening 26 formed in the upper wall 21a of the frame 21 in the vicinity of the right end of the upper wall 21a. Since provision of the opening 26 allows the projection member 19 to expand the bar spring 22 to a larger extent, the disengagement between the groove 14 and the bar spring 22 is ensured.

As the operator causes the release lever 12 to pivot, the acute projection 16 at the lower portion of the release lever 12 pivots in the K direction together with the pushed down end 12a of the release lever 12 while the above described movement is occurring. The acute projection 16 then protrudes from the opening formed at the lower end of the right lateral face 30a of the operation panel 1 (this opening is formed in the groove 14 at the lower right corner of the operation panel) and pivots to expand the lower portion 22b of the bar spring 22 against the elastically resisting force of the lower portion 22b of the bar spring 22 fit in the groove 14. In this manner, the acute extension 16 terminates the engagement between the lower portion 22b of the bar spring 22 and the groove 14, and this releases the retention imposed by the bar spring 22 on the right lateral face 30a of the operation panel 1. When the lower portion 22b of the bar spring 22 is expanded, the lower free end of the bar spring 22 protrudes from the opening 2 formed in the lower wall 21d of the frame 21 near the right end of the lower wall 21d. As the retention condition made by the right bar spring 22 is terminated, the balance between the retention resulting from the expanding force of the bar spring 22 and the pushing force of the push rod 29 is lost so that the push rod 27 urges the operation panel 1 forwards from the back side of the operation panel 1. When the operator pulls out the pushed-out right lateral face 30a of the operation panel 1 from the recess of the frame 21, the retention imposed by the left bar spring 22 on the left lateral face 30b of the operation panel is terminated so that the operation panel 1 is completely separated from the frame recess.

When the operator releases the pivoting release lever 12, i.e., the operator stops pushing down the end 12a of the release lever 12 in the K direction and frees the release lever 12, then the release lever 12 is caused to pivot in the J direction or clockwise by the biasing force of the coil spring, and the ends 12a and 12b are both returned to the respective original positions. At the same time, the acute projection 16 and the projection member 19 return to the original positions.

When the AV apparatus equipped with the above described operation panel 1 is not utilized, that is, when the operator(s) (i.e., car driver and passenger(s)) leaves the car, the operator wants to prevent the AV apparatus from being stolen. In such a case, the operator turns the operation panel 1 to use its back side a fake front face, and places the operation panel 1 into the frame recess of the apparatus main unit 20. The operation panel is designed to fit in the frame recess in a similar manner as when the operation panel fits in the frame recess with its front side being directed forwards.

Next, removal of the operation panel 1 from the frame recess with its back side being directed forwards will be described.

Figure 5:
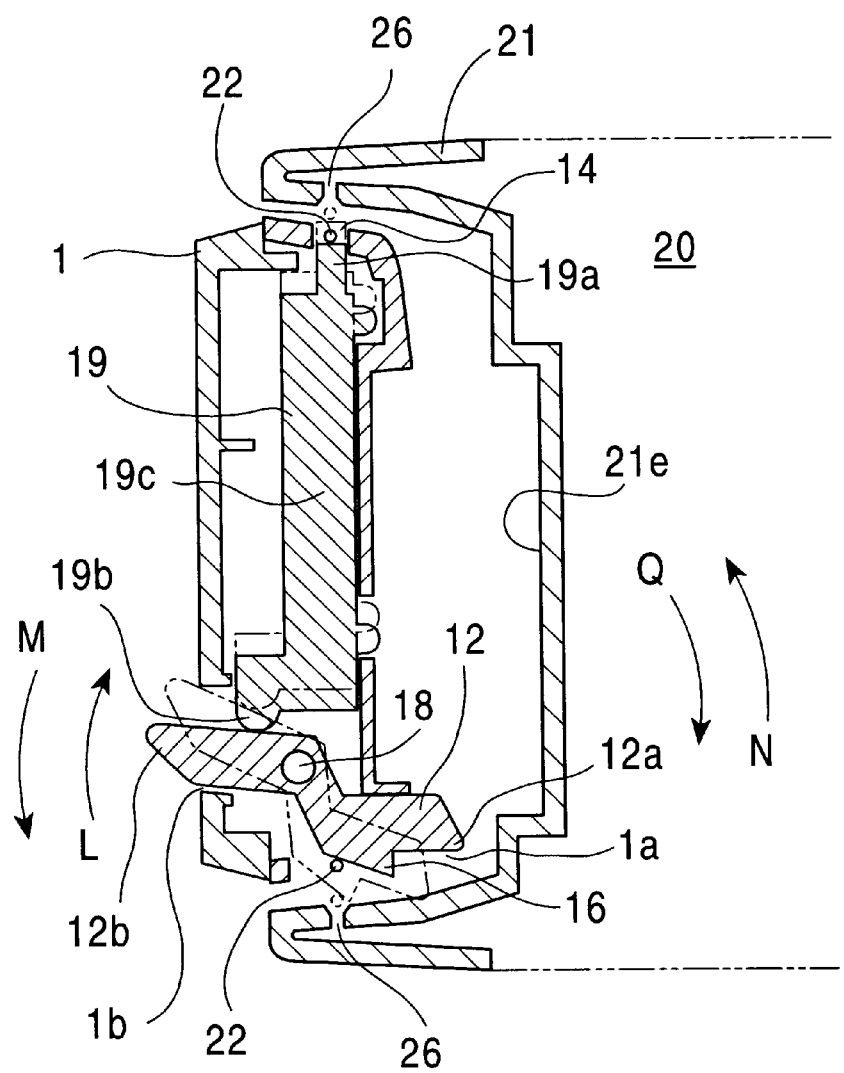
FIG. 5 is a cross sectional view of the first embodiment when the operation panel is attached with its back side front.

As best understood from FIG. 5, the operation panel 1 is placed in the frame recess with its front side being subjected to the back wall 21e of the frame recess. Thus, the end 12b of the release lever 12 now protrudes forwards (to the left in the drawing) from an opening 1b in the back wall of the operation panel 1. In this condition, the release lever 12 is biased to pivot in the M direction or counterclockwise in the drawing by a coil spring (not shown) installed near the support shaft 18. In order to remove the operation panel 1 from the illustrated condition, the operator pushes up the exposed end 12b of the release lever 12 in the L direction against the biasing force in the M direction. Upon this push up movement, the release lever 12 pivots in the L direction or clockwise about the support shaft 18, and the end 12b of the release lever 12 moves the projection member 19 upwards. This ascending movement causes the upper end 19a of the elongated member 19 to protrude from the opening formed at the upper end of the lateral end face 30a of the operation panel 1 (this opening is formed in the groove 14), and move expanding the upper portion 22a of the bar spring 22 against the resilient force of the upper portion 22a of the bar spring fit in the groove 14. As a result, the engagement between the groove 14 and the bar spring 22 is released. When the upper portion 22a of the bar spring is expanded, the upper free end of the bar spring 22 protrudes from the opening 26 formed in the upper wall 21a of the frame recess near the left end of the upper wall 21a.

As the operator causes the release lever 12 to pivot, the acute projection 16 on the lower portion of the release lever 12 also pivots in the Q direction against the biasing force in the N direction in the drawing together with the end 12a of the release lever 12 while the above described movement is proceeding. The acute projection 16 then protrudes from the opening formed at the lower end of the right lateral face 30a of the operation panel 1 (or the opening formed in the groove 14) and pivots to expand the lower portion 22b of the bar spring 22 against the elastic force of the lower portion 22b of the bar spring 22 fit in the groove 14. In this manner, the acute projection 16 disengages the lower portion of the bar spring 22 from the groove 14, and therefore the retention imposed by the bar spring 22 on the right lateral face 30a of the operation panel 1 is released. When the lower portion 22b of the bar spring is expanded, the lower free end of the bar spring protrudes from the opening 26 formed in the lower wall 21d of the frame recess near the left end of the lower wall 21d. Since there is no retention by the bar spring 22, the balance between the retention with the elastic force of the bar spring 22 and the pushing force of the push rod 27 is lost and the push rod 27 pushes the operation panel 1 forwards. As the operator pulls the pushed-out right lateral face 30a of the operation panel 1 out of the recess of the frame 21, the retention imposed by the bar spring 22 on the left lateral face 30b is released so that the operation panel 1 is completely taken out from the frame recess.

When the operator releases the pivoting release lever 12, i.e., the operator stops pushing up the end 12b of the release lever 12 in the L direction and frees the release lever 12, then the release lever 12 is caused to pivot in the M direction or clockwise by the biasing force of the coil spring, and both the ends 12a and 12b of the release lever 12 are returned to the respective original positions. At the same time, the acute projection 16 and the projection member 19 return to the original positions.

Figure 6:
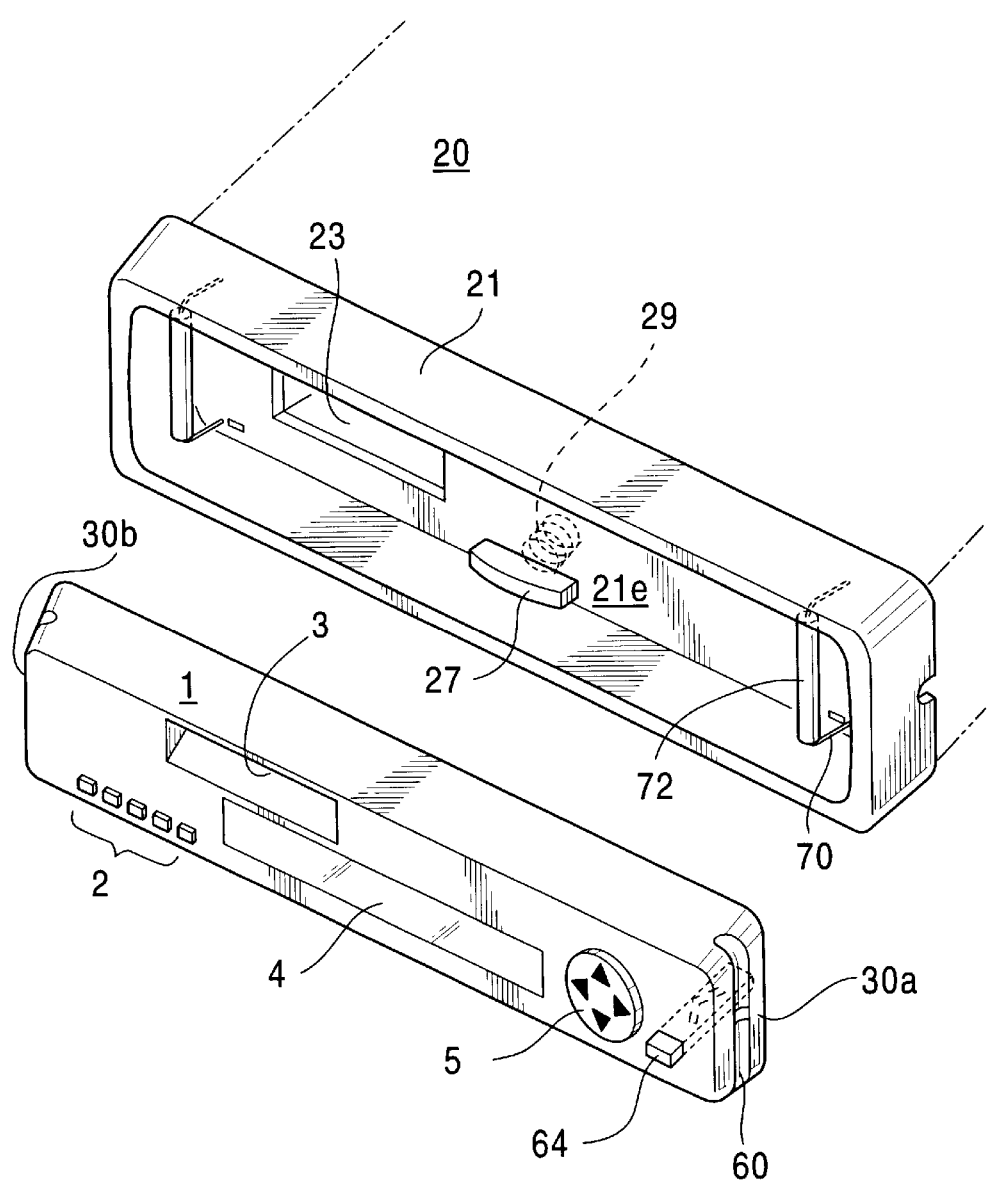
FIG. 6 is a perspective view of a second embodiment.

Referring to FIGS. 6 through 11, illustrated is a second embodiment of the present invention. As best shown in FIG. 6, the lateral faces 30a and 30b of the operation panel 1 have concave portions 60 that extend in parallel to the front surface of the operation panel 1.

Bar springs 70 are arranged on the back wall 21e of the frame recess near longitudinal ends of the back wall 21e such that they protrude to engage with the concave portions 60 formed in the lateral end faces of the operation panel 1. The vertical portion of each of the bar springs 70 has a generally cylindrical sleeve 72, and the sleeve 72 fits in the recess 60 when the operation panel 1 fits in the recess of the frame 21. The bar springs 70 normally bias the associated sleeves 72 in directions to enhance the engagement between the sleeves 72 and the recesses 60.

The groove 60 formed in the right lateral face 30a of the operation panel 1 has an opening that allows a free end of a push-out member 62 (will be described) to protrude from and retract in this opening.

Figure 8:
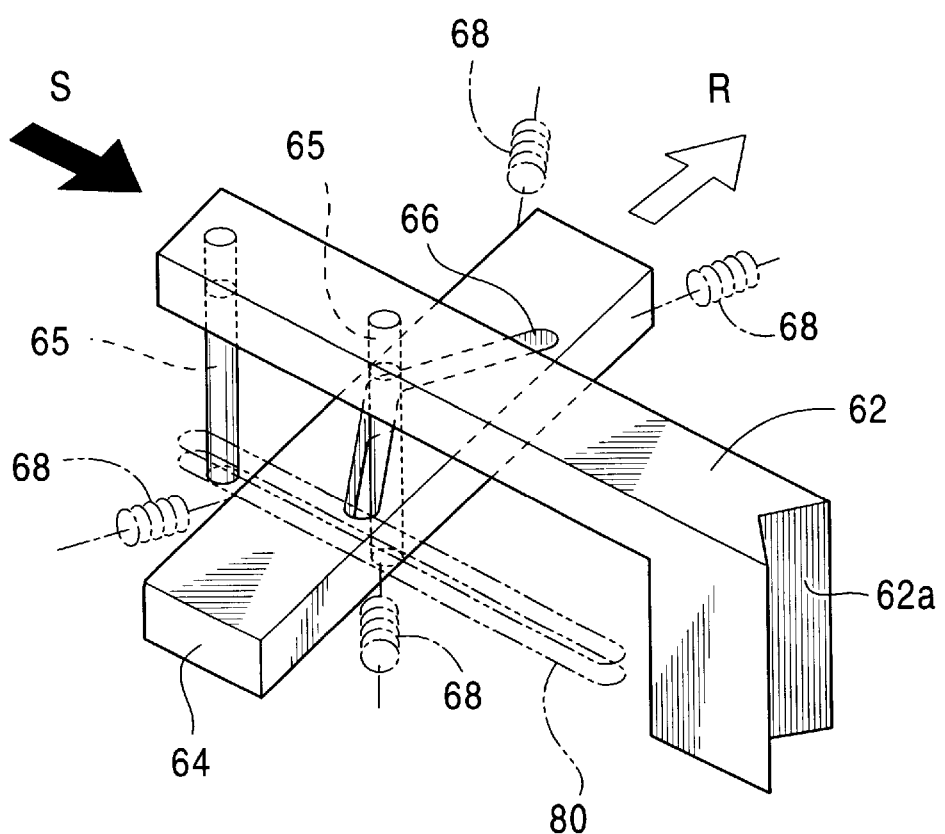
FIG. 8 illustrates a perspective view of part of the second embodiment.

Referring particularly to FIG. 8, the push-out member 62 has a generally "L" shape, and its shorter segment that extends perpendicularly to a lock member 64 (will be described) and extends/retracts in the opening 62 formed in the recess 60 has a depression 62a adapted to engage with the sleeve 72. This shorter segment is referred to as a front portion of the push-out member 62. The cross sectional shape of the depression 62a is a trough defined by two inclined surfaces to insure the engagement with the sleeve 72. Two generally pole-shaped support members 65 are buried in the longer segment of the "L"-shaped push-out member 62 at their one ends. The other ends of the support members 65 are slidably received in a guide groove 80 extending in parallel to the longer segment of the push-out member 62. The guide groove 80 is formed in the operation panel 1.

The lock member 64 having a generally rectangular shape extends in the operation panel 1 near the right lateral end 30a of the operation panel 1. The lock member 64 also penetrates the front and back faces of the operation panel 1 through openings formed in the front and back faces of the operation panel so that both ends of the lock member 64 are exposed. The lock member 64 is supported by the operation panel 1 such that it can move in a direction perpendicular to the front face of the operation panel 1. By pushing one of the exposed ends of the lock member 64, the operator can move the lock member 64.

Figure 7:
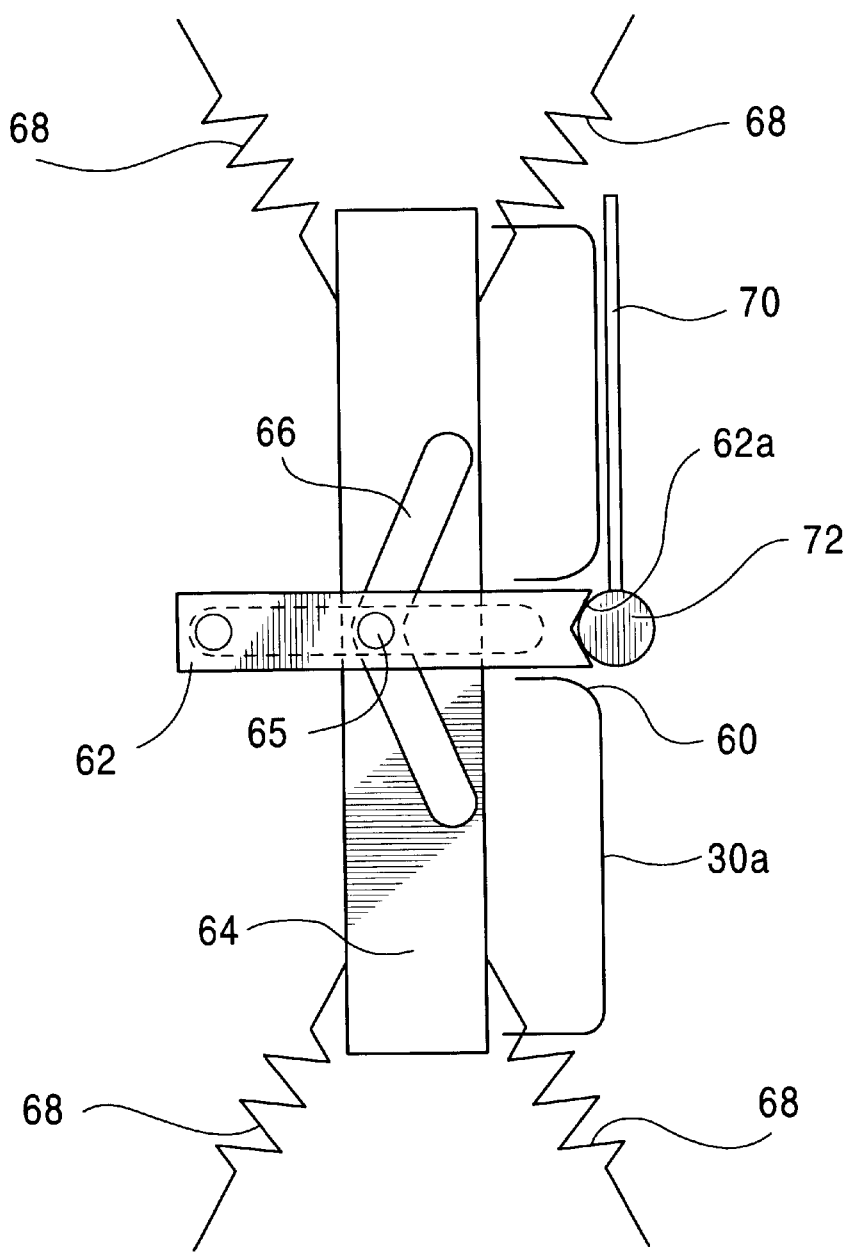
FIG. 7 illustrates a schematic plan view of the second embodiment when a sleeve engages with a push-out member.

A through hole 66 having a generally "V" shape is formed in an approximate middle of the lock member 64, and one of the cylindrical support members 65 (one positioned closer to the shorter segment of the L-shaped push-out member 62 in FIGS. 7 and 8) penetrates the through hole 66. The lock member 64 is biased by four coil springs 68 located in the operation panel 1 such that its ends are pulled in opposite directions. When the operator does not push the exposed ends of the lock member 64, therefore, the cylindrical support member 65 is always kept at the center of the through hole 66 by the biasing forces of the coil springs 65. When the support member 65 is situated at the center of the through hole 66, the front portion of the push-out member 62 is in a retracted position.

As particularly obvious from FIG. 8, if the operator presses one of the exposed ends of the lock member 64, the lock member 64 moves in a direction perpendicular to the operation panel 1. Upon this movement of the lock member 64, the support member 65 slides in the V-shaped through hole 66, and the lower end of the support member 65 slides in the guide groove 80. Consequently, the end face having the depression 62a of the front portion of the push-out member 62 protrudes from the opening formed in the groove 60 of the right end face of the operation panel. When the operator releases the lock member 64, on the other hand, the biasing forces of the coil springs 68 cause the lock member 64 to return to the original position. Specifically, the support member 65 returns to the center of the through hole 66 and the front portion of the push-out member 62 retracts in the operation panel 1.

A push rod 27 is provided at an approximate center of the back wall 21e of the framer recess. The push rod 27 is supported by a coil spring 29 such that it can move back and forth penetrating the back wall 21e of the frame recess. When the operation panel 1 is fit into the recess of the frame 21, the elastic force of the coil spring 29 pushes the operation panel 1 to stably hold the operation panel 1. When the operation panel 1 is removed from the frame recess, the elastic force of the coil spring 29 also pushes the operation panel 1 to facilitate removal of the operation panel.

In order to place the operation panel 1 in the recess of the frame 21 formed in the front area of the apparatus main unit 20 with the front face of the operation panel 1 being directed forwards, the operator first inserts the left lateral end face 30b of the operation panel 1 into the frame recess so as to engage the left sleeve 72 with the left recess 60. While maintaining the engaged condition, the operator then expands the left bar spring 70 that carries the left sleeve 72. Subsequently, the operator inserts the right lateral end face 30a of the operation panel 1 into the frame recess to engage the right sleeve 72 with the right recess 60. At this point, the sleeves 72 engaged with the lateral faces 30a and 30b of the operation panel 1 clamp and bias the operation panel 1 with the elastic forces of the bar springs 70. In this manner, the operation panel 1 is kept in the frame recess. In addition, the push rod 27 is provided at the approximate center of the back wall 21e of the frame recess such that it can move back and forth with the coil spring 27. When inserting the right end 30a of the operation panel 1 into the frame recess, therefore, the operator engages the right sleeve 72 with the mating recess 60 while the back side of the operation panel 1 is pushing the push rod 27. The push rod 27 that pushes the operation panel 1 forwards with the elastic force of the coil spring 29 further ensures the reliable retention of the operation panel 1 in the frame recess.

It should be noted that the above described manner of inserting and retaining the operation panel 1 in the frame recess is applicable when the operation panel 1 is inserted with its front side being directed to the back wall 21e of the frame recess.

Removal of the operation panel 1 from the frame recess with its front side being directed forwards will be described below. As particularly illustrated in FIG. 7, the sleeves 72 engage with the grooves 60 formed in the end faces 30a and 30b of the operation panel 1 and the support member 65 is positioned at the center of the through hole 66 when the operation panel 1 is in the retained condition. As the operator pushes the front exposed end of the lock member 64 in the R direction in FIG. 8, the lock member 64 moves backwards. Upon this movement, the support member 65 moves along the through hole 66, and the lower end of the support member 65 moves along the guide groove 80. Consequently, the push-out member 62 moves in the S direction in FIG. 8, and the front portion or the depression 62a of the push-out member 62 protrudes from the opening formed in the right recess 60 and engages with the sleeve 72. As the operator further pushes the lock member 64, the depression 62a pushes the sleeve 72 thereby expanding the bar spring 70 and disengaging the sleeve 74 from the recess 60.

Figure 9:
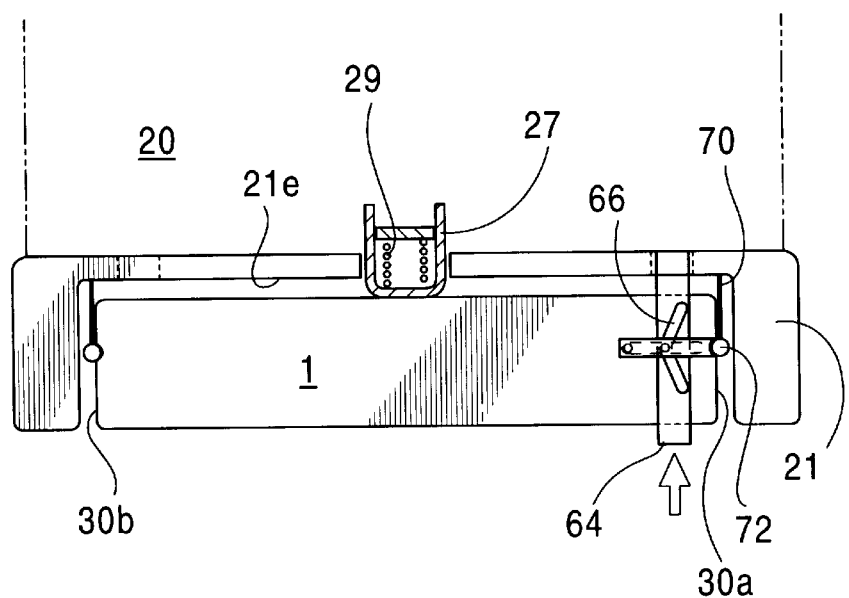
FIG. 9 illustrates a schematic plan view of the first configuration of the second embodiment.

As the right sleeve 72 is disengaged from the right recess 60 formed in the right lateral face 30a of the operation panel as shown in FIG. 10 from the condition shown in FIG. 9 in which the operation panel 1 is fit in the frame recess, the elastic force of the coil spring 29 causes the push rod 27 to push the operation panel 1 forwards from the back side of the operation panel so that the right face 30a of the operation panel 1 is pushed out (FIG. 11). As the operator pulls out the ejected right end 30a of the operation panel 1 from the frame recess, the engagement between the left recess 60 formed in the left end 30b of the operation panel 1 and the mating sleeve 72 is terminated so that the operation panel 1 is completely separated from the frame recess. If the operator stops pushing the front end of the lock member 64, the lock member 64 is caused to move in a direction opposite the R direction by the biasing forces of the coil springs 68 in FIG. 8. Accordingly, the support member 65 returns to the center of the through hole 66. It should be noted that the above described manner of removing the operation panel 1 from the recess of the frame 21 can be applied when the operation panel 1 is fit in the frame recess with its front side being exposed to the rear wall of the frame recess. In this case, the operator pushes the other end of the lock member 64 to eject the operation panel 1.

In the first and second embodiments described above, the surfaces or other portions of the bar springs 22, 70, the operation panel 1, the grooves 14, the depressions 60, the frame 21 and the apparatus main unit 20 may be appropriately bent, surface-treated and/or shape-treated to insure proper push-in retention of the operation panel 1 in the apparatus main unit 20.

As the theftproof structure, provided is the operation panel attaching/detaching mechanism of simple construction that allows the operation panel to be attached to the apparatus main unit with either the front or back side of the operation panel being directed forwards (or exposed), and to be detached from the apparatus main unit.

This application is based on a Japanese patent application No. 2000-257721 which is hereby incorporated by reference.

What is claimed is:

1. An audio and/or video apparatus installed in a vehicle comprising:

a main unit installed in a vehicle and adapted to reproduce an audio and/or video signal;

an operation panel independent of the main unit and adapted to operate the main unit; and a retention mechanism for releasably retaining the operation panel relative to the main unit regardless of whether a front or back side of the operation panel is directed forwards.

2. The audio and/or video apparatus installed in a vehicle according to claim 1, wherein the retention mechanism includes a mechanism for retaining the operation panel in the main unit with the front side of the operation panel being directed forwards, the mechanism also retains the operation panel in the main unit with the back side of the operation panel being directed forwards.

3. The audio and/or video apparatus installed in a vehicle according to claim 1 or 2, wherein the retention mechanism includes retaining device for retaining lateral faces of the operation panel in the main unit and release device provided in the operation panel for releasing retention of the retaining device.

4. The audio and/or video apparatus installed in a vehicle according to claim 3, wherein the operation panel has an elongated shape, and the retaining device retains longitudinal end faces of the operation panel in the main unit.

5. The audio and/or video apparatus installed in a vehicle according to claim 3, wherein the retention mechanism further includes a frame portion having a recess that can receive the operation panel in a fixed relation relative to the main unit, and the retaining device is an engagement mechanism that engages with lateral or outer faces of the operation panel when the operation panel is received in the recess of the frame portion.

6. The audio and/or video apparatus installed in a vehicle according to claim 5, wherein the retention mechanism includes a resilient member provided in the recess of the frame portion and an engagement portion provided on the lateral or outer faces of the operation panel for engaging with the resilient member when the operation panel is received in the recess of the frame portion, and the release device includes a push-out mechanism located in the operation panel for pushing out the resilient member, which engages with the engagement portion, from the engagement portion.

* * * * *